(12) United States Patent
Vora et al.

(10) Patent No.: US 11,203,160 B2
(45) Date of Patent: Dec. 21, 2021

(54) ADAPTIVE MULTI-PROCESS ADDITIVE MANUFACTURING SYSTEMS AND METHODS

(71) Applicant: The United States of America, as represented by the Secretary of the Navy, Crane, IN (US)

(72) Inventors: Hitesh D Vora, Stillwater, OK (US); Subrata Sanyal, Norco, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/370,871

(22) Filed: Mar. 29, 2019

(65) Prior Publication Data

US 2021/0016509 A1 Jan. 21, 2021

Related U.S. Application Data

(60) Provisional application No. 62/649,647, filed on Mar. 29, 2018.

(51) Int. Cl.
*B29C 64/393* (2017.01)
*B29C 64/268* (2017.01)
(Continued)

(52) U.S. Cl.
CPC .......... *B29C 64/393* (2017.08); *B29C 64/188* (2017.08); *B29C 64/268* (2017.08);
(Continued)

(58) Field of Classification Search
CPC ... B29C 64/393; B29C 64/268; B29C 64/188; B29C 64/194; G06N 3/08; G06N 3/02;
(Continued)

(56) References Cited

U.S. PATENT DOCUMENTS 9,399,256 B2 7/2016 Buller
9,803,966 B2 10/2017 Pettersson
(Continued)

FOREIGN PATENT DOCUMENTS

WO WO2012146943 A3 11/2012
WO WO2014071135 A1 5/2014
WO WO2016081651 A1 5/2016

*Primary Examiner* — Nahida Sultana
(74) *Attorney, Agent, or Firm* — Naval Surface Warfare Center, Crane Division; Christopher A. Monsey

(57) ABSTRACT

Apparatuses and methods are provided that provide adaptive multi-process additive manufacturing systems for monitoring, measuring, and controlling additive manufacturing processes. A first laser (e.g., a fiber laser) is used for melting and consolidating the powder, and a second laser is utilized for dual purpose: (a) for metrology to measure the surface roughness, dimensional accuracy, material properties, etc., and (b) based on the evaluated measurements to take corrective actions (laser ablation, etc.) to attain the desired surface finish and dimensional accuracy. Various elements provide defect detection, defect identification, and defect response actions which remove defect related material or address under print or missing material in a build object.

6 Claims, 6 Drawing Sheets

Corrective Strategies — 17

Corrective Actions - Over Print
Use laser ablation

Ablation laser mounted on 7-axis system to abate material in any direction

Corrective Actions - Under Print
Use AM deposition laser

AM deposition laser mounted on 7-axis system to add material in any directions

Corrective actions for every layer till the end print
Remove Material:
° Remove / abate the material for dimensional in accuracy, over print features, distortions, etc.
Add Material:
° Fill the voids, inclusions, dimensional in accuracy, under print features, support structure failure, etc.,

(51) Int. Cl.
  *B29C 64/188*   (2017.01)
  *G06N 3/08*     (2006.01)
  *B33Y 50/02*    (2015.01)
  *B33Y 30/00*    (2015.01)
  *B33Y 40/20*    (2020.01)

(52) U.S. Cl.
  CPC ............... *G06N 3/08* (2013.01); *B33Y 30/00* (2014.12); *B33Y 40/20* (2020.01); *B33Y 50/02* (2014.12)

(58) Field of Classification Search
  CPC ......... B33Y 50/02; B33Y 30/00; B33Y 40/20; B33Y 10/00
  See application file for complete search history.

(56) References Cited

U.S. PATENT DOCUMENTS

| | | |
|---|---|---|
| 2015/0045928 A1 | 2/2015 | Perez |
| 2015/0321422 A1* | 11/2015 | Boyer .................... G01J 5/004 264/497 |
| 2016/0001509 A1 | 1/2016 | Long |
| 2016/0184893 A1 | 6/2016 | Dave |
| 2016/0236414 A1 | 8/2016 | Reese |
| 2016/0318129 A1 | 11/2016 | Hu |
| 2017/0001379 A1 | 1/2017 | Long |
| 2017/0173695 A1 | 6/2017 | Myerberg |
| 2017/0227408 A1* | 8/2017 | Helvajian ............. B29C 64/393 |
| 2017/0264735 A1* | 9/2017 | Terra Rios ............. G06F 40/58 |
| 2019/0143408 A1* | 5/2019 | Graham ................ B33Y 10/00 419/53 |
| 2020/0086387 A1* | 3/2020 | Sharon ............... B23K 26/0006 |
| 2021/0323093 A1* | 10/2021 | Graham ................ B33Y 30/00 |

\* cited by examiner

FIG. 5
SYSTEM SOFTWARE MODULES

| STEP: 303 |
|---|

↓

| STEP: 305 |
|---|

↓

| STEP: 307 |
|---|

FIG. 6A

| STEP: 401 |
|---|
| (Continued at FIG. 6B) |

FIG. 6B

| STEP 401 (continued): |
|---|

↓

| STEP: 303 |
|---|

↓

| STEP: 305 |
|---|
| (Continued at FIG. 6C) |

FIG. 6C

| Continued from FIG. 6B |
|---|
| STEP: 307 |

ADAPTIVE MULTI-PROCESS ADDITIVE MANUFACTURING SYSTEMS AND METHODS

CROSS-REFERENCE TO RELATED APPLICATIONS

The present application claims priority to U.S. Provisional Patent Application Ser. No. 62/649,647, filed Mar. 29, 2018, entitled "Adaptive Multi-Process Additive Manufacturing System", the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,502 and 200,437) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The invention relates to adaptive multi-process additive manufacturing (AM) systems for monitoring, measuring, and controlling AM processes. In particular, various embodiments focus on in-situ and real-time monitoring and feedback which is used to identify defects and correct them after or as layers are being built-up by an AM system. Corrective strategies are selected by an embodiment of the system based on detection or measurement systems or alternatively allows a new corrective strategy to be input.

BACKGROUND AND SUMMARY OF THE INVENTION

Embodiments of this disclosure relates to systems and methods of performing real-time in-situ process monitoring, measurement, and control of additive manufacturing (AM) processes in order to achieve the desired surface finish and dimensional accuracy.

Real-time, in-situ process monitoring and control can play a significant role in achieving improved surface finish and dimensional accuracy. Various high-end non-destructive testing (NDT) and metrology methods such as coordinate measuring machine (CMM), X-ray computer tomography (X-ray CT), laser ultrasonic testing, and optical methods (pyrometers, IR and CMOS cameras, profilometer, etc.) can be used for post-processing of AM printed parts to identify defects (external or internal), surface finish, and dimensional accuracy. However, all these methods are expensive, time-consuming, and data-intensive that need significant post-processing analyses to produce required information and enable corrective or responsive action to a wide variety of defects or manufacturing failures. High precision application such as aviation or mission close tolerance applications are particularly impacted by these capability gaps. Therefore, none of these methods are currently capable to carry out the much needed real-time, in-situ process monitoring, measurement, and control. Because of these limitations, AM parts show the distinct surface roughness (like staircase) with poor dimensional accuracy, along with various internal structural and micro-structural defects that seriously hampers the wide spread adoption of AM technology. Generally, the post-processing methods (subtractive machining) such as grinding, polishing, sand blasting, milling, etc. are utilized to attain the desired surface finish and dimensional accuracy that are needed to certify a part. However, these processes are time consuming and need material handling.

Embodiments of the invention provide an advantage of completely/partly removing or eliminating post-processing (subtractive machining) steps and using another laser (ultrafast) for corrective action to achieve desired surface roughness and dimensional accuracy. Embodiments of the invention can utilize a hybrid approach where two lasers originating from the same or different laser sources are used. A first laser (e.g., a fiber laser) is used for melting and consolidating the powder, and a second laser is utilized for dual purpose: (a) for metrology to measure the surface roughness, dimensional accuracy, material properties, etc., and (b) based on the evaluated measurements to take corrective actions (laser ablation, etc.) to attain the desired surface finish and dimensional accuracy. These embodiments enable quality improvement through real-time in-situ process monitoring, measurement, and control can oversee the process closely and allow control on processing parameters, enhance repeatability and interchangeability of parts, create appreciable time savings through multi-operation stage with high-end features, no post-processing machining requirements, and no material handling, and allow ready-to-use printed parts. Embodiments can completely/partly eliminate post-processing (subtractive machining) steps and use another laser (ultrafast) for corrective action to achieve the desired surface roughness and dimensional accuracy.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 5 shows a simplified software module architecture in accordance with one exemplary embodiment of the invention;

FIG. 6A shows an exemplary method in accordance with one exemplary embodiment of the invention;

FIG. 6B shows a continuation of the FIG. 6A exemplary method in accordance with one exemplary embodiment of the invention; and FIG. 6C shows a continuation of the exemplary FIGS. 6A and 6B exemplary method in accordance with one exemplary embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, embodiment of the invention includes exemplary AM systems utilizing, for example, a powder bed fusion process. A first laser (e.g., a fiber laser) is used for melting and consolidating the powder, and a second laser is utilized for dual purpose: (a) for metrology to measure the surface roughness, dimensional accuracy, material properties, etc., and (b) based on the evaluated measurements to take corrective actions (laser ablation, etc.) to attain the desired surface finish and dimensional accuracy. Another exemplary AM system can be provided utilizing a directed energy deposition process. A first laser (e.g., a fiber laser) can be used for melting and consolidating the powder, and a second laser is utilized for dual purpose: (a) for metrology to measure the surface roughness, dimensional accuracy, material properties, etc., and (b) based on the evaluated measurements to take corrective actions (laser ablation, etc.) to attain the desired surface finish and dimensional accuracy. Exemplary embodiments can include computer-controlled fully automated Robotic arm with six-axis motion capability, which can accommodate multiple lasers. A first laser can be used for additive manufacturing, and a second laser can be used for corrective action (e.g., additive and subtractive manufacturing). Exemplary embodiments can accommodate optical tools and laser scan heads and manage multiple processes. Various types of laser can be used, including fiber lasers, Nd:YAG lasers, ultrafast lasers, etc. A full or partial enclosure can surround the AM site to provide a controlled environment. Exemplary embodiments can use a computer-controlled fully automated Gantry Robot with 6-axis motion capability, which can accommodate multiple lasers. A first laser can be used for additive manufacturing, and a second laser can be used for corrective action (e.g., additive and subtractive manufacturing). Exemplary embodiments can accommodate optical tools and laser scan heads and manage multiple processes. Various types of laser can be used, including fiber lasers, Nd:YAG lasers, ultrafast lasers, etc. A full or partial enclosure can surround the AM site to provide a controlled environment. Alternative embodiments can include other laser-based processing such as: laser machining (e.g., drilling, cutting, milling, etc.), laser polishing, laser surface texturing, laser surface engineering, and laser surface coating.

Figure 1A:
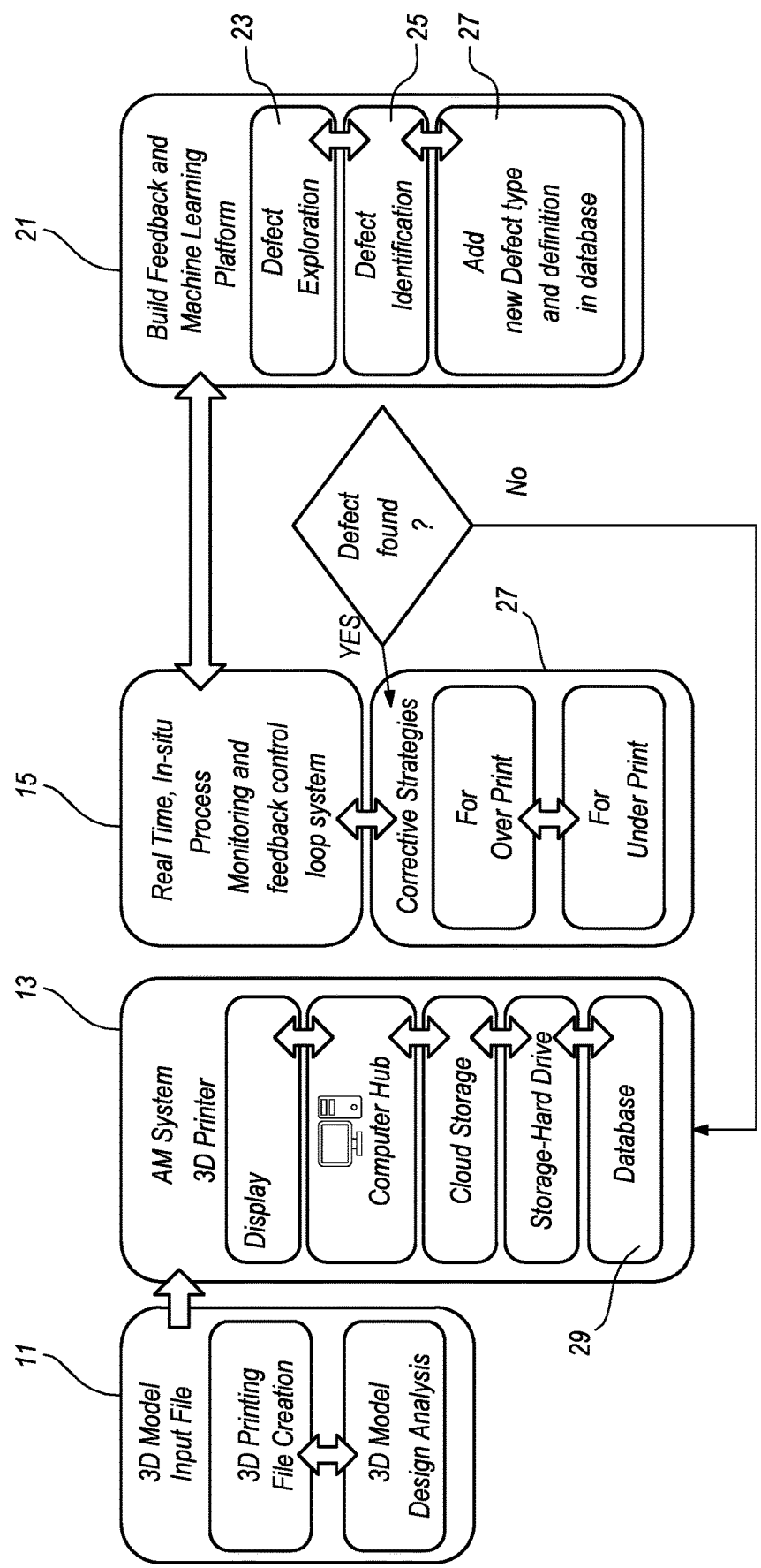
FIG. 1A shows a simplified diagram of a high level system overview of an embodiment of the invention.

FIG. 1A shows a simplified system architecture of one embodiment of the invention. In particular, a 3D model input file 11 which has been created via 3D printing file and 3D model design analysis systems is created. The 3D model input file 11 is input into an AM system printer system 11 which includes a display, computer hub, an optional cloud storage system, a data storage hard drive, and a database system which interact with each other. A real time, in-situ monitoring and feedback control loop (ISM FCL) system 15 is provided which communicates and operates a Corrective Strategies Section 17 and a Build Feedback and Machine Learning Platform 21. The Corrective Strategies Section 17 includes machine instructions for altering operation of the AM 3D printer system 13 in response to detected defects which include Over Print and Under Print defects. The Build Feedback and Machine Learning Platform 21 system includes a Defect Exploration System 23, a Defect Identification System 25 and an Add New Defect Type and Definition in a system database 27. The ISM FLC System 15 operates the Defect Exploration System which receives sensor inputs (See FIG. 1A for example) and compares stored data or 3D Model Input File data 21 with the received sensor inputs to determine if a defect then identifies a specific type of defect via the Defect Identification system 25. The Defect Identification system 25 data is then correlated by the ISM FCL 15 system with Corrective Strategies machine instructions and database 17 associated with the identified specific type of defect; then stored instructions for operating a laser (e.g., see FIG. 1A) to ablate an overprint or add additional additive manufacturing material to an under print condition or defect (or another type of defect). Note various software systems, e.g., ISM FLC 15, Defect Identification System 25, Corrective Strategies System, etc., can be hosted on the computer that is included in the AM system 13 or on another system in communication with the computer coupled with the 3D printer AM system 13. Multiple lasers can be used to increase effectiveness or precision of removal effects where the lasers can be oriented in a variety of ways to reduce damage to adjacent sections of a build layer with an overprint or another type of defect (e.g., texture, etc.).

Figure 1B:
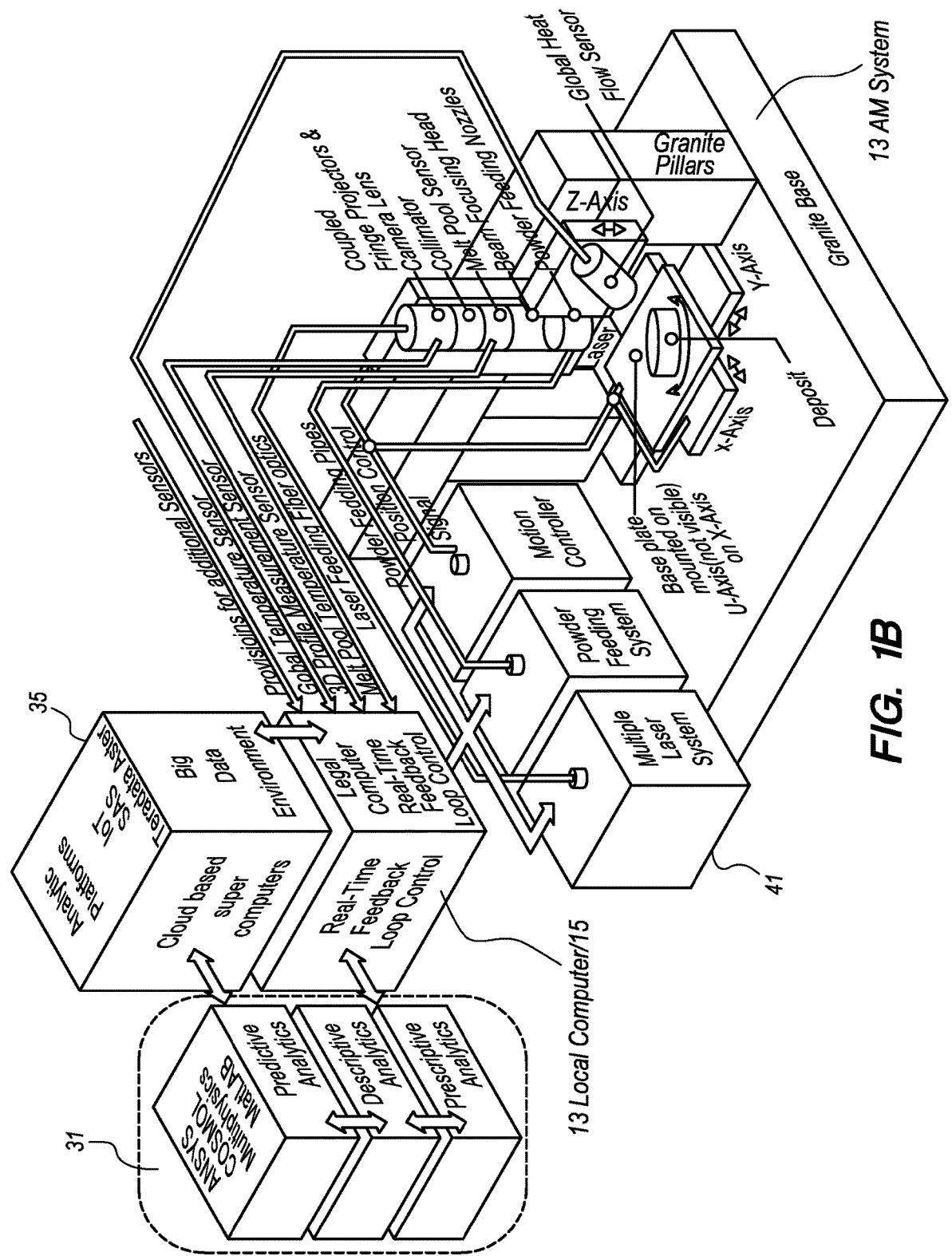
FIG. 1B shows another simplified system architecture of one embodiment of the invention.

FIG. 1B shows another simplified system architecture of one embodiment of the invention. In particular, A machine learning stack 31 can be provided which implements or hosts, e.g., the FIG. 1A Build Feedback and Machine Learning Platform 21 (or the Platform 21 can be hosted on the local computer 39. The machine learning stack 31 can include a Predictive Analytic Section, a Descriptive Analytics Section, and a Prescriptive Analytics Section which collectively communicate with a cloud based system with a big data environment (optional) and a Local Computer 13 hosting a Real Time Feedback Loop Control System (FLC System) 15 (e.g., the FIG. 1A ISM FLC System 15 hosted on computer 13). The Local Computer in this embodiment also hosts the FIG. 1A Build Feedback and Machine Learning Platform (BFMLP) 21 system that includes the Defect Exploration System 23, Defect Identification System 25 and Add New Defect Type and Definition in a system database 27 machine processing or instruction sections. The FLC System 15, BFMLP 21, and Corrective Strategies machine instructions and database 17 collectively operate to operate the multiple lasers 41 (with orientation or positioning systems (not shown)) and the AM System 13 to perform real time defect detection and correction. A variety of sensors are integrated into the system including temperature sensors, 3D profile measurement sensors, and melt pool temperature sensors which provide data inputs to various elements of the overall exemplary system. A build plate is shown as a part of the AM System 13.

Figure 2:
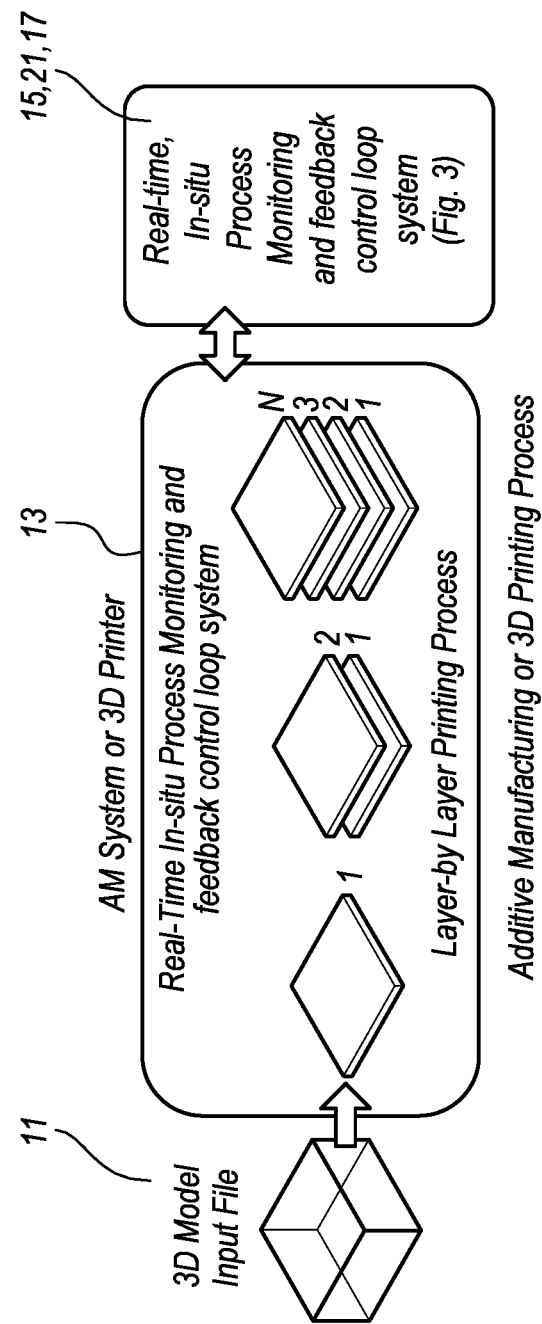
FIG. 2 shows an exemplary high level or simplified AM manufacturing process with in-situ process monitoring and feedback control loops such as those shown in FIG. 3.
Figure 3:
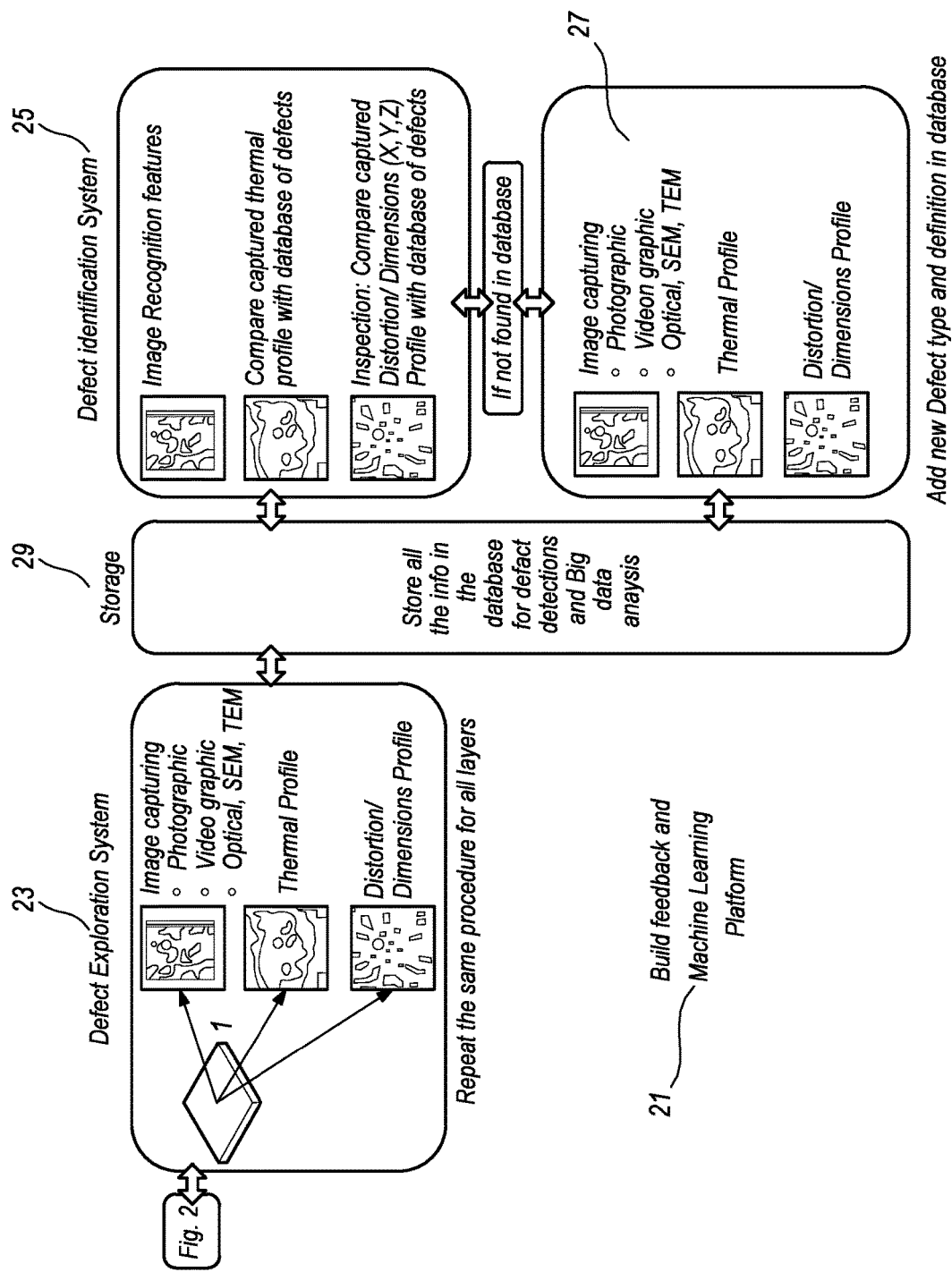
FIG. 3 shows an exemplary real-time, in-situ process monitoring and feedback control loop system.

FIG. 2 shows an exemplary high level or simplified AM manufacturing process with in-situ process monitoring and feedback control loops operated by system components as those shown in FIGS. 1A, 1B, and 3. The 3D Model Input File 11 is input into the AM System or 3D Printer 13 which performs layer by layer printing processing (layer 1, layer 2, layer 3, layer N, etc.) while the Real Time, In-Situ Process Monitoring and Feedback Control Loop System (E.g., see FIG. 1A, 1B, and FIG. 3; FLC System 15, BFMLP 21, and Corrective Strategies machine instructions and database 17) perform detect identification and correction to each layer.

FIG. 3 shows an exemplary real-time, in-situ process monitoring and feedback control loop system with more detail regarding the BFMLP 21 system. In particular, BFMLP 21 system includes the Defect Exploration System 23, Defect Identification System 25 and Add New Defect Type and Definition in a system database 27 machine processing or instruction sections. The Defect Exploration System 23 controls sensors (e.g., image capture sensors that capture photographic, video graphics, optical, scanning electron microscope (SEM), tunneling electron microscope (TEM) systems as well as thermal profile capture sensors, and sensors that capture or detect distortion or dimensional profile data. The Defect Identification System 25 includes image or sensor data recognition systems (e.g., feature recognition). Embodiments also can perform comparison of captured thermal profile sensor data with a database of stored defect data or comparator data. The Defect Identification 25 also can perform inspection or comparison of captured distortion/dimensions (x, y, z) sensor data outputs with data base of defects. The Add New Defect Type and Definition system 27 further operates to take image or sensor data, thermal profile data, and/or inspection of distortion/dimensional profile data to a data storage system 29 (or another database in an alternative embodiment). Defect exploration, identification and optically add defect operations can be repeated for each layer as they are produced by the AM/3D printer system 13.

Figure 4:
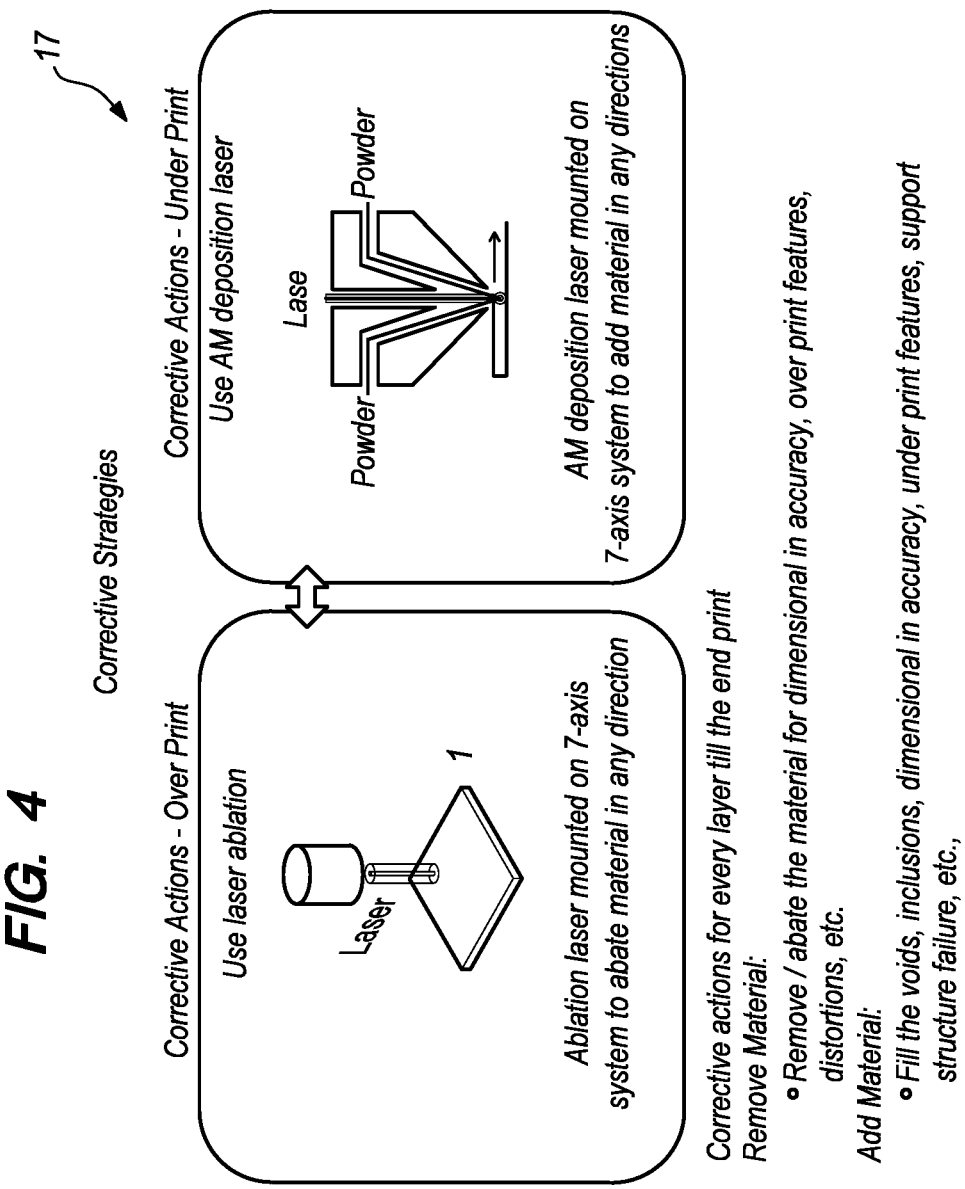
FIG. 4 shows exemplary corrective actions including strategies to address underprint and overprint defects.

FIG. 4 shows exemplary corrective actions including strategies to address underprint and overprint defects; For example, an Over Print corrective action can include machine instructions which orient one or more lasers to execute a laser ablation operation on an over print or other defect condition on an AM build layer. An exemplary ablation laser can be mounted on a 7 axis system to provide precise orientations of the laser based on a stored library of machine instructions which select maneuvering of the laser (s) and operation of the laser to include power, pulse type, selection of laser type (e.g., ultrashort pulse laser, etc.). The Corrective Actions 17 section further includes a library of corrective actions or machine instructions associated with various types of under print related defects where machine instructions operate the AM system 13 to perform AM deposition. Alternative embodiments can include a system which applies AM build material directly to an defect location, e.g., under print location, independently of the AM System 13 then operates a separate AM laser to perform layer touch up or spot build up on a particular defect location. Corrective actions are selected and executed (operation of various elements of the system) for every layer as defects are detected until end of AM printing operations. Removal of materials ablate material for dimensional accuracy, address distortions and other types of over prints. Add material operations fill voids, inclusions, reduce or eliminate dimensional inaccuracy, underprinted features, apply added material etc. to mitigate this class of defects.

FIG. 5 shows a simplified software module architecture in accordance with one exemplary embodiment of the invention. In particular, system software modules are provided which include: Defect exploration processing section 303 including sensor data with defect or feature detection/comparison to build model geometry or shape to ID AM build defects (Neural network/machine learning/modeling system), distortion/dimensional profile comparator with model or CAD file data. Defect identification processing section 305 including processing sequences for identification of specific defects based on comparison of defect exploration sensor outputs with defect library file data. Defect response control processing section 307 including sequences which correlate defect identification data from the defect identification processing section with defect response machine instructions from a plurality of defect responses that correct a build layer to include a first and second response; machine processing instructions then execute the first response including orienting laser using an automated armature or movable fixture, selection of laser power and modulation, operate laser, and image capture and comparison with desired structure to monitor defect ablation or correction until defect is removed or mitigated, the sequences further include ones that execute the second response including adjusting a second layer to adjust for actual build after defect ablation or correction is completed.

FIG. 6A shows an exemplary method in accordance with one exemplary embodiment of the invention. At Step 401: Providing an additive manufacturing (AM) system including an in-situ measurement and corrective action system including: an AM system that produces a plurality of AM build layers based on an input AM build file; a plurality of lasers that are operable to selectively orient on and ablate material from one or more of the AM build layers and measure the plurality of AM build layers during and after the have been produced by the AM system; an orienting system for the plurality of lasers; a sensing system that includes a sensor or imager system that selectively orients towards and generates sensor outputs or sensor data captures e.g., image captures of each AM build layer during or after printing, the sensor outputs or sensor data captures include electromagnetic (e.g., optical, x-rays, etc.) and/or thermal images, the sensing system further can include one or more of a group comprising a scanning electron microscope (SEM), a transmission electron microscope (TEM), thermal profile, and distortion/dimensional profile sensing systems; a measuring system that receives inputs from at least one of the plurality of lasers and measures the AM build layer during and after the AM system prints or produced the AM build layers; a data storage or hard drive storing a plurality of in-situ monitoring and corrective action system machine instructions to operate the system comprising: a defect exploration system that operates the sensing system to generate the sensor outputs or sensor data capture of said AM build layers; a defect identification system that classifies or identifies one or more defects in the AM build layers that correlate elements of the sensor outputs or sensor data with stored defect data, the defect identification system accesses a defect library including a plurality of detectable build layer defect patterns including comparison of the sensor system and defect exploration system outputs with entries in the defect library files, e.g. by a feature or pattern recognition system, to identify a respective one of the one or more defects, wherein the defect library includes pixel patterns associated with one or more defects which are compared by the feature recognition system, wherein the defect identification system comprises a feature or pattern recognition system which receives outputs of the sensing system including images of the build layers from a build object produced from the AM system, the feature or pattern recognition system comprises a neural network and/or other machine learning system; (Continued at FIG. 6B)

FIG. 6B shows a continuation of the FIG. 6A exemplary method in accordance with one exemplary embodiment of the invention. Step 401 (continued): a corrective action section that includes a corrective action library that includes a plurality of build layer defect corrective action processing sequences that control the AM system or at least one of the plurality of lasers, wherein the corrective action section or the in-situ monitoring system further includes machine instructions that selects one or more of the build layer defect correction action processing sequences in the corrective action library based on correlation between a detectable build layer defect pattern or patterns and an associated build layer defect correction action processing sequences stored in the corrective action library, wherein each of the build layer defect correction action processing sequences include predetermined corrective response actions associated with each of the defect library entries including an overprint and under print corrective response action, wherein the plurality of build layer defect correction action processing sequences includes machine instruction sequences for controlling at least one of the plurality of lasers to ablate some or all of a detected said build layer defects and machine instruction sequences for controlling the AM printer to fill in or adjust a geometry or section of a subsequently applied build layer adjacent to respective detected defects; a defect library and corrective action library input section that provides an operator of the in-situ measurement and corrective action system a user interface to accept operator inputs of new said plurality of build layer defect corrective action processing sequences and new said plurality of detectable build layer defect patterns; an in-situ monitoring system section that receives inputs from the feature recognition system and interacts or controls the defect exploration system, the defect identification system, and the corrective action section as well as the AM system; and at least one controller system that includes at least one processor which executes the machine instructions for controlling various elements including the AM system, the plurality of lasers, the measuring system, the in-situ monitoring and corrective response action system, and the orienting system; Step 303: Operating the AM system to generate an AM build layer on a build platform or section; Step 305: Identifying said one or more defects using the in-situ measurement correction action sections, the measurement system, the sensor system, the in-situ monitoring section, the defect exploration system, the defect identification system, and corrective response action system, and the controller system executing the machine instructions to identify the one or more defects in the build layer after some or all of the build layer produced; (continued at FIG. 6C)

FIG. 6C shows a continuation of the exemplary FIGS. 6A and 6B exemplary method in accordance with one exemplary embodiment of the invention. Continued from FIG. 6B: Step 307: Selecting one of the corrective action using the in-situ monitoring section, the defect exploration section, the defect identification section, and corrective response action section, that includes one or more said build layer defect correction actions including one or more layer adjustment actions or one or more layer section ablative actions, wherein the one or more layer adjustment action comprises controlling the AM printer, to adjust the AM system to build the subsequently applied or next AM product layer to adjust a shape or geometry of the subsequently applied or next AM build layer in response to the detected one or more defects in a previously applied or built layer comprising reducing width or adding width at or in proximity to the detected defect, wherein the one or more layer section ablative actions comprises selecting an ablative or material removal operation sequence stored within the corrective action library, wherein the ablative or material removal operation includes operating at least one of the plurality of lasers and orienting system to remove some or all of the identified defect while operating another laser of said plurality of lasers to monitor ablation or removal of the identified defect a predetermined time period and at a predetermined power defined by the an ablative or material removal operation sequence until the in-situ monitoring system determines the defect, including a structural irregularity, is removed or partially removed from the AM build layer.

Although the invention has been described in detail with reference to certain preferred embodiments, variations and modifications exist within the spirit and scope of the invention as described and defined in the following claims.

The invention claimed is:

1. An additive manufacturing (AM) system including an in-situ measurement and corrective action system comprising:
an AM system that produces a plurality of AM build layers based on an input AM build file;
a plurality of lasers that are operable to selectively orient on and ablate material from one or more of the AM build layers and measure the plurality of AM build layers during and after they have been produced by the AM system;
an orienting system for the plurality of lasers;
a sensing system that includes a sensor or imager system that selectively orients towards and generates sensor outputs or sensor data captures of each AM build layer during or after printing, the sensor outputs or sensor data captures include electromagnetic and/or thermal images, the sensing system further can include one or more of a group comprising a scanning electron microscope (SEM), a transmission electron microscope (TEM), thermal profile, and distortion/dimensional profile sensing systems;
a measuring system that receives inputs from at least one of the plurality of lasers and measures the AM build layer during and after the AM system prints or produced the AM build layers;
a data storage or hard drive storing a plurality of in-situ monitoring and corrective action system machine instructions to operate the system comprising:
a defect exploration system that operates the sensing system to generate the sensor outputs or sensor data capture of said AM build layers;
a defect identification system that classifies or identifies one or more defects in the AM build layers that correlate elements of the sensor outputs or sensor data with stored defect data, the defect identification system accesses a defect library including a plurality of detectable build layer defect patterns including comparison of the sensor system and defect exploration system outputs with entries in the defect library files by a feature or pattern recognition system to identify a respective one of the one or more defects, wherein the defect library includes pixel patterns associated with one or more defects which are compared by the feature recognition system, wherein the defect identification system comprises a feature or pattern recognition system which receives outputs of the sensing system including images of the build layers from a build object produced from the AM system, the feature or pattern recognition system comprises a neural network and/or other machine learning system;
a corrective action section that includes a corrective action library that includes a plurality of build layer defect corrective action processing sequences that control the AM system or at least one of the plurality of lasers, wherein the corrective action section or the in-situ monitoring system further includes machine instructions that selects one or more of the build layer defect correction action processing sequences in the corrective action library based on correlation between a detectable build layer defect pattern or patterns and an associated build layer defect correction action processing sequences stored in the corrective action library, wherein each of the build layer defect correction action processing sequences include predetermined corrective response actions associated with each of the defect library entries including an overprint and under print corrective response action, wherein the plurality of build layer defect correction action processing sequences includes machine instruction sequences for controlling at least one of the plurality of lasers to ablate some or all of a detected said build layer defects and machine instruction sequences for controlling the AM printer to fill in or adjust a geometry or section of a subsequently applied build layer adjacent to respective detected defects;
a defect library and corrective action library input section that provides an operator of the in-situ measurement and corrective action system a user interface to accept operator inputs of new said plurality of build layer defect corrective action processing sequences and new said plurality of detectable build layer defect patterns; and
an in-situ monitoring system section that receives inputs from the feature recognition system and interacts or controls the defect exploration system, the defect identification system, and the corrective action section as well as the AM system; and
at least one controller system that includes at least one processor which executes the machine instructions for controlling various elements including the AM system, the plurality of lasers, the measuring system, the in-situ monitoring and corrective response action system, and the orienting system.

2. The AM system of claim 1, wherein the plurality of lasers is used to execute ablative removal of the one or more defects from the plurality of lasers that is used to perform AM layer build operations.

3. The AM system of claim 1, wherein a first laser is used for melting and consolidating additive manufacturing material for a respective one of the AM build layers and a second laser is utilized for a dual purpose comprising metrology to measure surface roughness, dimensional accuracy, material properties of each AM build layer and, based on evaluated measurements, to execute one or more of the corrective actions comprising laser ablation to produce a desired surface finish and dimensional accuracy of each said AM build layer.

4. A method of operating an additive manufacturing (AM) system including an in-situ measurement and corrective action system comprising:
providing an additive manufacturing (AM) system including an in-situ measurement and corrective action system comprising:
an AM system that produces a plurality of AM build layers based on an input AM build file;
a plurality of lasers that are operable to selectively orient on and ablate material from one or more of the AM build layers and measure the plurality of AM build layers during and after the have been produced by the AM system;
an orienting system for the plurality of lasers;
a sensing system that includes a sensor or imager system that selectively orients towards and generates sensor outputs or sensor data captures of each AM build layer during or after printing, the sensor outputs or sensor data captures include electromagnetic and/or thermal images, the sensing system further can include one or more of a group comprising a scanning electron microscope (SEM), a transmission electron microscope (TEM), thermal profile, and distortion/dimensional profile sensing systems;
a measuring system that receives inputs from at least one of the plurality of lasers and measures the AM build layer during and after the AM system prints or produced the AM build layers;
a data storage or hard drive storing a plurality of in-situ monitoring and corrective action system machine instructions to operate the system comprising:
a defect exploration system that operates the sensing system to generate the sensor outputs or sensor data capture of said AM build layers;
a defect identification system that classifies or identifies one or more defects in the AM build layers that correlate elements of the sensor outputs or sensor data with stored defect data, the defect identification system accesses a defect library including a plurality of detectable build layer defect patterns including comparison of the sensor system and defect exploration system outputs with entries in the defect library files by a feature or pattern recognition system to identify a respective one of the one or more defects, wherein the defect library includes pixel patterns associated with one or more defects which are compared by the feature recognition system, wherein the defect identification system comprises a feature or pattern recognition system which receives outputs of the sensing system including images of the build layers from a build object produced from the AM system, the feature or pattern recognition system comprises a neural network and/or other machine learning system;
a corrective action section that includes a corrective action library that includes a plurality of build layer defect corrective action processing sequences that control the AM system or at least one of the plurality of lasers, wherein the corrective action section or the in-situ monitoring system further includes machine instructions that selects one or more of the build layer defect correction action processing sequences in the corrective action library based on correlation between a detectable build layer defect pattern or patterns and an associated build layer defect correction action processing sequences stored in the corrective action library, wherein each of the build layer defect correction action processing sequences include predetermined corrective response actions associated with each of the defect library entries including an overprint and under print corrective response action, wherein the plurality of build layer defect correction action processing sequences includes machine instruction sequences for controlling at least one of the plurality of lasers to ablate some or all of a detected said build layer defects and machine instruction sequences for controlling the AM printer to fill in or adjust a geometry or section of a subsequently applied build layer adjacent to respective detected defects;
a defect library and corrective action library input section that provides an operator of the in-situ measurement and corrective action system a user interface to accept operator inputs of new said plurality of build layer defect corrective action processing sequences and new said plurality of detectable build layer defect patterns; and an in-situ monitoring system section that receives inputs from the feature recognition system and interacts or controls the defect exploration system, the defect identification system, and the corrective action section as well as the AM system; and at least one controller system that includes at least one processor which executes the machine instructions for controlling various elements including the AM system, the plurality of lasers, the measuring system, the in-situ monitoring and corrective response action system, and the orienting system;

operating the AM system to generate an AM build layer on a build platform or section;

identifying said one or more said defects using the in-situ measurement correction action sections, the measurement system, the sensor system, the in-situ monitoring section, the defect exploration system, the defect identification system, and corrective response action system, and the controller system executing the machine instructions to identify the one or more defects in the build layer after some or all of the build layer produced;

selecting and executing one of the corrective action using the in-situ monitoring section, the defect exploration section, the defect identification section, and corrective response action section, that includes one or more said build layer defect correction actions including one or more layer adjustment actions or one or more layer section ablative actions, wherein the one or more layer adjustment action comprises controlling the AM printer, to adjust the AM system to build the subsequently applied or next AM product layer to adjust a shape or geometry of the subsequently applied or next AM build layer in response to the detected one or more defects in a previously applied or built layer comprising reducing width or adding width at or in proximity to the detected defect, wherein the one or more layer section ablative actions comprises selecting an ablative or material removal operation sequence stored within the corrective action library, wherein the ablative or material removal operation includes operating at least one of the plurality of lasers and orienting system to remove some or all of the identified defect while operating another laser of said plurality of lasers to monitor ablation or removal of the identified defect a predetermined time period and at a predetermined power defined by the an ablative or material removal operation sequence until the in-situ monitoring system determines the defect, including a structural irregularity, is removed or partially removed from the AM build layer.

5. The method of claim 4, wherein the plurality of lasers is used to execute ablative removal of the one or more defects from the plurality of lasers that is used to perform AM layer build operations.

6. The method of claim 4, wherein a first laser is used for melting and consolidating additive manufacturing material for a respective one of the AM build layers and a second laser is utilized for a dual purpose comprising metrology to measure surface roughness, dimensional accuracy, material properties of each AM build layer and, based on evaluated measurements, to execute one or more of the corrective actions comprising laser ablation to produce a desired surface finish and dimensional accuracy of each said AM build layer.

* * * * *